May 23, 1939.  R. A. SANDBERG ET AL  2,159,821
FRICTION TYPE BRAKE LEVER
Filed April 1, 1938
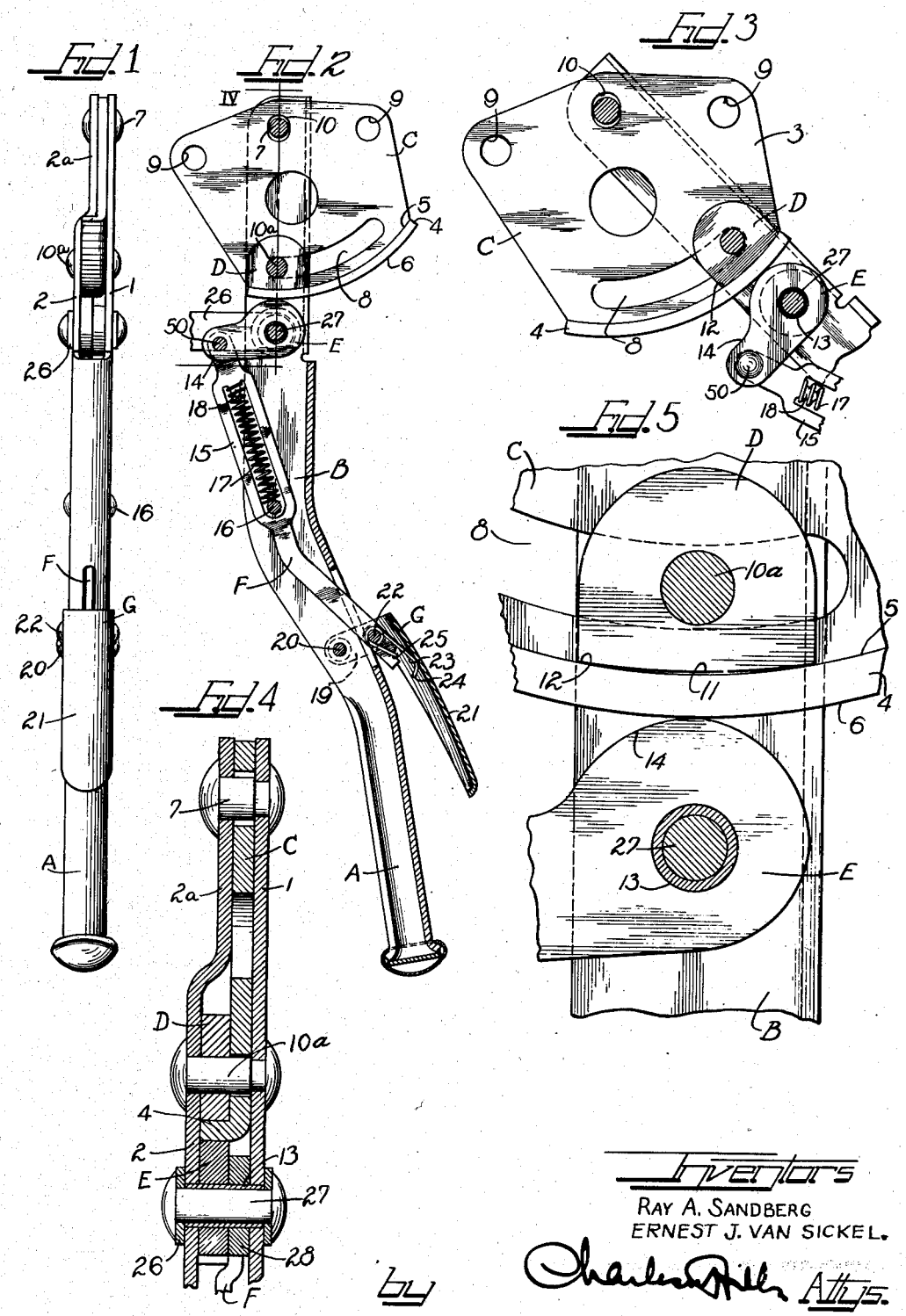
Inventors
RAY A. SANDBERG
ERNEST J. VAN SICKEL.

Patented May 23, 1939

2,159,821

UNITED STATES PATENT OFFICE 2,159,821

FRICTION TYPE BRAKE LEVER

Ray A. Sandberg and Ernest J. Van Sickel, Waukegan, Ill., assignors, by mesne assignments, to Houdaille-Hershey Corporation, Detroit, Mich., a corporation of Michigan Application April 1, 1938, Serial No. 199,348

6 Claims. (Cl. 74—531)

The present invention relates to friction type brake levers for automotive vehicles and is concerned with one which may be constructed, in the main, of stampings, and which may be readily assembled at minimum labor cost, to thereby produce brake levers in quantity production at low manufacturing costs.

An object of the present invention is to provide a simple and inexpensive brake construction for holding a braking mechanism in any adjusted position.

Another object of the present invention is to provide a friction type brake lever for automotive vehicles which may be manufactured at low cost to sell on a competitive basis, and which is highly efficient in operation.

A further object of the present invention is to improve brake lever construction whereby manufacturing costs may be reduced to a minimum for quantity production, and which is so designed and constructed as to be highly efficient in service without sacrificing any of its positive holding features.

Generally speaking, the lever construction of the present invention contemplates a stamped lever shaft, a mounting member stamped from flat material to provide a pivotal support for the shaft and at the same time afford an outturned flange having concave convex surfaces for engagement by the clutch members, stamped clutch members carried by the shaft, a stamped clutch release member mounted on the shaft, and an actuating member of stamped metal on the shaft and operatively associated with the release member.

The above, other and further objects of the present invention will be apparent from the following description and accompanying drawing.

The accompanying drawing illustrates an embodiment of the present invention and the views thereof are as follows:

Figure 1 is an edge elevational view of an automotive vehicle emergency brake lever constructed in accordance with the principles of the present invention;

Figure 2 is a view, partially in side elevation and partially in central section of the lever of Figure 1, showing the parts as the same appear when the lever is in "off" position;

Figure 3 is an enlarged fragmental view, partially in elevation and partially in section, of the fulcrum end of the lever shaft showing the lever shaft swung to its limit in brake setting direction and illustrating the manner of clutching the shaft to the mounting member to set the brakes;

Figure 4 is an enlarged vertical sectional view taken through the fulcrum end of the lever along the line IV—IV of Figure 2;

Figure 5 is an enlarged fragmental view of the clutch member engageable with the flange of the mounting member for holding the lever shaft in adjusted position, certain of the parts being exaggerated as to contour for the sake of clarity.

The drawing will now be explained.

The form of lever shaft chosen to exemplify the present invention is formed as a stamping with a substantially cylindrical grip portion A, an intermediate shank portion B with legs 1 and 2 laterally separated to provide a space for straddling a mounting member C.

The mounting member C is formed as a stamping with a body portion 3 arranged in substantially vertical position, and an outturned flange 4 formed with concentric surfaces, one a concave surface 5 and the other a convex surface 6, which surfaces are struck on arcs whose center is the axis of the pivot pin 7 which pivotally connects the lever shaft to the mounting member C. Inwardly of the flange 4 an arcuate slot 8 is punched out of the vertical portion of the mounting member for a purpose to be later explained.

The mounting member C is provided with suitable apertures, such as 9, to receive attaching bolts or rivets for securing the mounting member in place on a vehicle. Where the lever is mounted as of the dash or cowl type, the plate C is secured behind the instrument board, with the lever hanging from the same to present its grip portion A below the lower margin of the instrument board.

The ends of the legs 1 and 2, at the pivotal portions thereof, are apertured to receive the pivot 7. The mounting member C is formed with an aperture 10, slightly elongated, to allow a slight endwise shifting movement of the lever shaft with respect to the mounting member C which shaft movement occurs as the clutch members frictionally engage the flange 4 of the mounting member to hold the lever shaft in adjusted position.

The lever shaft is mounted on the mounting member C, with one of its legs, leg 1 as herein illustrated, lying flatwise against the rear side of the mounting member and with the leg 2 overlying the opposite face or side of the mounting member. The upper extremity of the leg 2 is bent inwardly as at 2a to lie against the adjacent face of the mounting member C to prevent rattle.

Supported on a pivot 10a passing through the slot 8 of the mounting member and engaging suitable apertures in the legs 1 and 2 of the shaft, is a block D, constituting one of the clutch members. The block D has a convex face 11 engageable with the concave face 5 of the flange 4, which convex face is constructed on an arc having a radius slightly greater than the arc describing the concave face 5 of the flange 4 of the mounting member so that as the block D is rocked on its pivot 10a, as occasioned by pull exerted on the lever shaft by the connected brake rigging, the corner 12 of the block will tend to bite into the concave face 5 of the flange 4 and thus increase the holding effect of the clutch members. The holding effect of the clutch members is directly proportional to the pull applied to the lever shaft by the brake mechanism.

The block D, however, is constructed for slight rocking movement on its pivot which rocking movement is hardly perceptible to casual inspection, but nevertheless occurs in the operation of the clutch members.

The leg 2 of the shaft bears against one face of the block D in a manner to hold it against the engaged face of the mounting member C to prevent rattle.

A cooperating clutch member E is rockably supported on the shaft by means of a bushing 13 which is passed through a suitable aperture in the member and also registering apertures in the side walls or legs of the shaft. The member E is formed as a cam, with a cam margin 14 adapted to bear against the convex face 6 of the flange 4 to cooperate with the block D to hold the lever in adjusted position.

As illustrated, the member E has a tail portion 14 projecting laterally outwardly of the shaft, as illustrated in Figure 2.

A release member F is formed as a stamping with an enlarged intermediate portion 15, which is centrally slotted. A pin 16 is secured in the side walls of the shank portion of the lever shaft and passes through the slotted portion of the release member as clearly illustrated in Figure 2. The upper end of the release member is pivoted at 50 to the tail 14 of the pawl member E. A spring 17 is arranged within the slot of the release member and bears at one end against the pin 16 and at the other end against the upper end of the slot adjacent the pivotal connection of the release member to the pawl. The release member is formed with a tongue 18 which tongue enters the upper end of the spring to prevent its displacement with respect to the release member slot.

A manipulating member G, formed as a stamping, has laterally spaced ears 19 for straddling the lever shaft above the grip portion A of the same to which it is pivoted as at 20. The manipulating member has an elongated palm engaging portion 21 lying along a part of the grip portion of the lever and is conveniently curved in cross section to afford a smooth surface for the hand of an operator. The lower end of the release member F is pivotally connected to the manipulating member G at 22. A spring 23 has an intermediate portion surrounding the pin 22, and has one end 24 bearing against the actuating member G and its other end 25 hooked over the end of the release member to normally maintain the pawl in frictional engagement with the flange 4 and the portion 21 of the manipulating member spaced from the grip portion of the lever shaft, as clearly shown in Figure 2.

A yoke 26 is pivoted to the lever shaft by means of a pin 27 passed through the bushing 13. The yoke 26 is connected by any means, not shown, to the brake mechanism of the vehicle.

As may be observed in Figure 4, a shim or spacer 28 is interposed between one face of the cam E and the adjacent face of the leg 1 of the lever, to prevent rattle and to maintain the cam in operative position with respect to the flange 4 of the mounting member C.

The operation of the lever is as follows:

Figure 2 shows the position of the parts, with the clutching members in frictional engagement with the flange 4 of the mounting member C to hold the lever in adjusted position. The position shown in this figure is the "off" position of the lever shaft.

The spring 17 tends normally to urge the cam E in clockwise direction, as viewed in Figures 2 and 5, thus into tight frictional engagement with the flange 4 of the mounting member.

Whenever the lever is swung to set the brakes, the operator grasps the grip portion A of the lever and swings it in counter-clockwise direction. Such movement, because of the contour of the cam surface 14 of the cam member E, rolls the cam member slightly to disengage it from frictional engagement with the flange 4, thus enabling movement of the lever shaft to brake setting position without having to actuate the manipulating member G. When the lever has been swung to desired position, the operator releases his hold on the grip portion, whereupon the pull of the brake mechanism through the yoke 26 tends to move the lever shaft in retrograde direction. Such tendency to move will cause the cam member E to roll on the convex face 6 of the flange 4 in clockwise direction, increasing the frictional engagement of the cam member with the flange and thus cooperating with the block D to hold the shaft in its then adjusted position. As the cam member E is urged into frictional engagement with the flange 4, it tends to shift the lever shaft, slightly, on the mounting member C, which shifting is made possible by reason of the elongated aperture 10 in the mounting member C. It will be apparent that as the clutch members D and E are gripped against the flange 4, most of the strain incidental to the pull of the brake rigging is removed from the pivotal connection 7 of the lever shaft to the mounting member and confined to the flange 4 of the mounting member. This enables the use of a relatively small pivot 7 for connecting the lever shaft to the mounting member.

To release the lever from its set position, the operator grasps the handle grip portion A and squeezes the portion 21 of the manipulating member G towards the grip portion of the lever whereupon the cam member E is swung in counterclockwise direction moving its high point away from the convex surface 6 of the flange 4, thus releasing the clutch members D and E from frictional engagement with the flange thereby enabling return of the lever to its "off" position.

It will be observed that the lever of the present invention is one which may be economically constructed, as a majority of the parts are formed as stampings. The construction is such that the lever may be readily assembled at minimum labor cost so that the finished lever may be sold at an attractive price for competitive business.

The construction of the lever is such that as the pull of the brake mechanism increases, or as the lever is swung to tightly set the brakes, the tendency of the lever shaft to move in retrograde direction, due to brake pull, increases the frictional engagement of the clutching members with the flange 4 to thereby increase the holding effect of the clutch and thus assure that no movement of the lever shaft in retrograde direction occurs.

It is to be understood that the invention is not limited to the particular construction of lever shaft, as this form of shaft is chosen for exemplary purposes only. The invention lends itself through adaptation to brake lever shafts of different forms and shapes.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. In an automotive vehicle emergency brake lever construction, the combination of a stamped attaching or mounting member having a flat fulcrum portion and having a lateral flange struck with concave and convex surfaces concentric with the lever pivot, a lever shaft pivoted to the flat portion of said mounting member, a clutch member pivoted to and rockable on said lever shaft and having a convex face working against the concave face of said flange, a second clutch member pivoted to and rockable on said shaft and working against the convex face of said flange, means for normally rocking said second clutch member into engagement with said flange, the construction being such that the pulling effect of the brake mechanism on the lever shaft will tend to move the shaft in the direction of the pull and thereby roll said second clutch member on said flange to draw said clutch members into tight frictional engagement with the concentric faces of said flange.

2. In an automotive vehicle emergency brake lever construction, in combination, a support, a lever shaft pivoted to said support to swing, said support having an integral lateral arcuate flange with concave and convex surfaces concentric with the lever pivot, a block loosely mounted on said shaft and having a convex face to cooperate with the concave face of said flange and with its face described on a slightly greater radius, a rockable cam member on said lever shaft having a convex face cooperating with the convex face of said flange to cooperate with said block to frictionally engage the flange and hold the lever in adjusted position, spring means urging said cam member into holding engagement with said flange, and a release member on said shaft operably connected with said cam to disengage the cam from holding engagement with said flange.

3. In an automotive vehicle emergency brake lever construction, a supporting plate provided with an integral lateral flange having concave and convex arcuate surfaces struck on radii whose center is the axis of the lever pivot, a lever shaft pivoted to said support to swing, a plurality of rockable clutch means pivoted to said lever shaft and engaging both of said flange surfaces, spring means for normally maintaining said clutch means in frictional holding engagement with said flange, and a release member operatively connected with one of said clutch and operable for relieving the holding engagement of said clutch means with said flange.

4. An automotive vehicle emergency brake lever construction including a shaft comprising a stamping providing spaced legs at one end, a mounting plate, said legs being pivotally attached to said plate astraddle of the same, said plate having an integral lateral flange between said shaft legs, said flange having concentric concave and convex surfaces struck from the lever pivot as a center, a block carried by said legs between one of said legs and said plate having a convex margin engageable with the concave face of said flange, a cam between said legs having a convex face cooperating with the convex face of said flange, an elongated bar shiftably supported on said shaft and connected to one end of said cam, said bar being slotted, a spring in said slot tending normally to maintain said cam in frictional engagement with said flange, and means for actuating said bar to move said cam out of engagement with said flange.

5. In an automotive vehicle emergency brake lever construction, in combination, a support, said support having an integral lateral arcuate flange with concave and convex surfaces concentric with the lever pivot, a lever shaft pivoted to said support to swing, a member rockably mounted on said shaft and having a convex face to cooperate with the concave face of said flange, said convex face of said member terminating in abrupt corners, the radius of said convex face of said member being slightly greater than the radius of the concave face of said flange whereby the roll of said rockable member on the concave face of the flange causes one of said corners to bite said concave face with frictional engagement which increases directly proportional to the pull exerted on the lever shaft.

6. A brake lever construction including a plate having a lateral flange formed with convex and concave clutching surfaces, a lever member having spaced legs astraddle said plate and flange and pivoted to said plate through the ends of the legs, clutching members rockably pivoted to said lever shaft between said legs and disposed to frictionally engage the clutching surfaces of said flange, release means on said lever operably connected with one of said clutching members to rock said member away from holding engagement with said flange, and means acting against said one clutching member to normally rock said one clutching member in a direction to urge said member to holding engagement with said flange.

RAY A. SANDBERG.
ERNEST J. VAN SICKEL.